United States Patent
Hargreaves (10) Patent No.: US 7,524,090 B2
(45) Date of Patent: Apr. 28, 2009

(54) HORTICULTURE LIGHT FIXTURE HAVING INTEGRATED LAMP AND BALLAST

(75) Inventor: Craig Hargreaves, Vancouver, WA (US)

(73) Assignee: IP Holdings LLC, Vancouver, WA (US)

( * ) Notice: Subject to any disclaimer, the term of this patent is extended or adjusted under 35 U.S.C. 154(b) by 0 days.

(21) Appl. No.: 11/679,140

(22) Filed: Feb. 26, 2007

(65) Prior Publication Data

US 2008/0205030 A1 Aug. 28, 2008

(51) Int. Cl.
*F21V 29/00* (2006.01)
(52) U.S. Cl. .................. 362/294; 362/264; 362/265; 362/373; 362/805
(58) Field of Classification Search ........... 362/221, 362/222, 264, 265, 294, 373, 805, 346
See application file for complete search history.

(56) References Cited

U.S. PATENT DOCUMENTS

| | | | |
|---|---|---|---|
| 3,829,677 A | * | 8/1974 | DeLlano ............... 362/346 |
| 4,078,169 A | * | 3/1978 | Armstrong ............ 362/805 |
| 6,548,948 B1 | | 4/2003 | Muessli |
| 6,595,662 B2 | | 7/2003 | Wardenburg |
| 6,679,619 B2 | | 1/2004 | Saieva |
| 7,083,309 B2 | | 8/2006 | Chan et al. |

* cited by examiner

*Primary Examiner*—Stephen F Husar
(74) *Attorney, Agent, or Firm*—Robert J. Ireland (57) ABSTRACT

A horticultural light system integrating a grow lamp and lamp ballast within a single fixture. The grow lamp is enclosed by the lower exterior structure and benefits from cooling atmosphere that is forced through the lower exterior structure to regulate the grow lamp temperature. The lamp ballast is mounted to a ballast plate above the lower exterior structure. The ballast plate shields the lamp ballast from the heated atmosphere as it rises off the top of the lower exterior structure. Stand offs or other separation means keep the ballast plate at a distance from the top of the lower exterior structure to create an air gap that thermally isolates the lamp ballast from the heat generated by the grow lamp, thereby increasing the reliability and life of the lamp ballast.

3 Claims, 10 Drawing Sheets

HORTICULTURE LIGHT FIXTURE HAVING INTEGRATED LAMP AND BALLAST

CROSS REFERENCES TO RELATED APPLICATIONS

None

STATEMENT REGARDING FEDERALLY SPONSORED RESEARCH OR DEVELOPMENT

This invention is not the product of any Federally Sponsored Research or Development.

REFERENCE TO MICROFICHE APPENDIX

Not Applicable

BACKGROUND OF THE INVENTION

1. Technical Field

The present device relates generally to horticultural and agricultural lighting systems used in developing and growing plants in controlled environments.

2. Discussion of Related Art

Indoor gardens, green houses, hydroponics systems, and isolated carbon dioxide growing chambers demand careful regulation of temperature, light, hydration, nutrients, and humidity. In these controlled environments the grower must provide adequate light intensity, which is usually accomplished using an HID grow lamp in cooperation with a remote HID lamp ballast that is located within a couple feet of the HID grow lamp.

The most common HID grow lamps are high pressure sodium and metal halide. Metal halide lamps work well to generate the "blue" spectrum, but also produce well in the "orange-red" spectrum. Metal halides are best suited as a primary light source (if little or no natural sunlight is available) and are excellent for plant growth. High pressure sodium lamps produce primarily in the "orange-red" spectrum. The high pressure sodiums are the best available lamps for secondary or supplemental lighting (used in conjunction with natural sunlight). The "orange-red" type of light promotes flowering/budding/fruiting in plants. High pressure sodium lamps are ideal for greenhouse or commercial growing applications. However, one significant drawback is the heat generated by these grow lamps. Without cooling, the lamps will prematurely fail. Due to the extreme heat, any electronics located in close proximity to the grow lamp will also prematurely fail.

Both the metal halide lamps and the high pressure sodium lamps require high voltage power to ignite the lamps and maintain lumen output. Commonly, the high voltage power supply is referred to as a lamp ballast. These lamp ballasts convert the standard 110 volt or 220 volt electrical service power to high voltage electrical power that meets the requirements of the metal halide and high pressure sodium lamps. The lamp ballasts are often housed a safe distance from the grow lamp in separate aluminum extruded cases, with a power cord connecting the grow lamp to the lamp ballast.

Lamp ballasts suffer from temperature sensitivity in that excessive temperatures cause premature failure of the electronic components, leading to decreased performance. Because of the heat generated by the grow lamp, the lamp ballast must be thermally isolated in order to prevent premature failure. Generally, the horticulture light fixture with the grow lamp is sold separately from the lamp ballast assembly and the end-user connects the two via a power cord.

Previously integrating the lamp ballast into the horticulture light fixture was not feasible due to the high temperatures generated by the grow lamp and the relatively low temperature failure rates of the ballast. If installed too close to the grow lamp, the lamp ballast will fail prematurely due to the heat produced by the lamp and absorbed by the ballast.

U.S. Pat. No. 6,595,662 to Wardenburg (2003) teaches a horticulture light fixture benefiting from a sealed forced air or passive cooling system. The passive or active cooling of the grow lamp prolongs the life of the lamp while isolating the growing environment from the excessive heat generated by the grow lamp. The Wardenburg horticulture light fixture requires a remote lamp ballast to ignite and power the grow lamp.

An ideal horticulture light system would be constructed and arranged having the lamp, lamp ballast, and reflector integrated as a single structure that, preferably, is thermally isolated from the growing environment. Prior attempts to integrate the lamp ballast into the horticulture light fixture have failed because excessive heat produced by the grow lamp was absorbed by the lamp ballast, causing premature failure of the lamp ballast. Lamp ballasts are sensitive to heat; and, as the operating temperature increases, performance and longevity decrease.

3. Objects and Advantages

There are several objects and advantages of the present device:

a) to provide a horticulture light system that integrates the grow lamp and lamp ballast into a single easy-to-install fixture;

b) to provide an integrated horticulture light system wherein the lamp ballast does not suffer from premature failure due to absorption of heat generated by the grow lamp;

c) to provide an integrated horticulture light system wherein the lamp ballast is thermally isolated from the grow lamp enclosure by an air gap.

Still further objects and advantages will become apparent from consideration of the following description and drawings.

SUMMARY

In accordance with the present device, a horticulture light system constructed and arranged to integrate a lamp ballast into the same fixture as the grow lamp without the lamp ballast suffering from premature failure.

DESCRIPTION OF THE PREFERRED EMBODIMENT

Referring now to the drawings, and particularly to FIGS. 1-10, a preferred embodiment of the present device is shown, illustrating the horticultural and agricultural lighting systems used in developing plants in controlled growing environments. The exemplary embodiments according to the present device are illustrated with those components necessary to demonstrate the inventive design. Many of the necessary electrical and mechanical elements for attaching, powering, and implementing are not present. For example, the electrical service connection of 110 volts or 220 volts is known by one of normal skill in the art but not specifically mentioned. The horticulture lamp types most commonly used are high pressure sodium and metal halide—both high intensity discharge and requiring specific power that is well known by one of ordinary skill in the art. Elements not present or described below may take on any known form consistent with forms readily realized by one of ordinary skill in the art, having knowledge of the mode of operation of a horticulture light system.

As used herein, "grow light" is the desired radiation having a wavelength within the spectrum of light that promotes photosynthesis in plants. A "grow lamp" can mean any presently available lamp or combination of lamps capable of generating radiation within the "grow light" spectrum. "Lamp ballast" is the electrical component that converts service power (i.e. 110 volt or 220 volt) to the requisite "grow lamp" power requirements (i.e. 1200 volt). The "growing environment" is the confined gas around the plants that may be as simple as air, or could be a complex combination of carbon dioxide and introduced moisture for a balanced humidity. "Plants" refers to growing, developing, and living plants maintained in potted soil, hydroponics, or other growing medium, generally parallel to the earth's surface. A "reflector hood" is an internal hood made of reflective material and constructed with folds and bends to reflect light towards the plants. A "transparent portion" is a transparent plate that can be made of any transparent substance that will be impervious to air but allow light to pass through. A "reflector chamber" is the space bounded by the "reflector hood" and "transparent portion." A "cooling atmosphere" is gas moved into the "reflector chamber" to cool the lamp, surrounding area, and "reflector chamber." A "heated atmosphere" is gas moved out of the "reflector chamber" and away from the surrounding area. "Gas" can be normal air, Co2-enhanced air, or some other gaseous combination effective at either cooling or advantageous to plant development. A "fixator" can be any device, apparatus, or adhesive capable of holding a "transparent portion" securely to the fixture.

Figure 1:
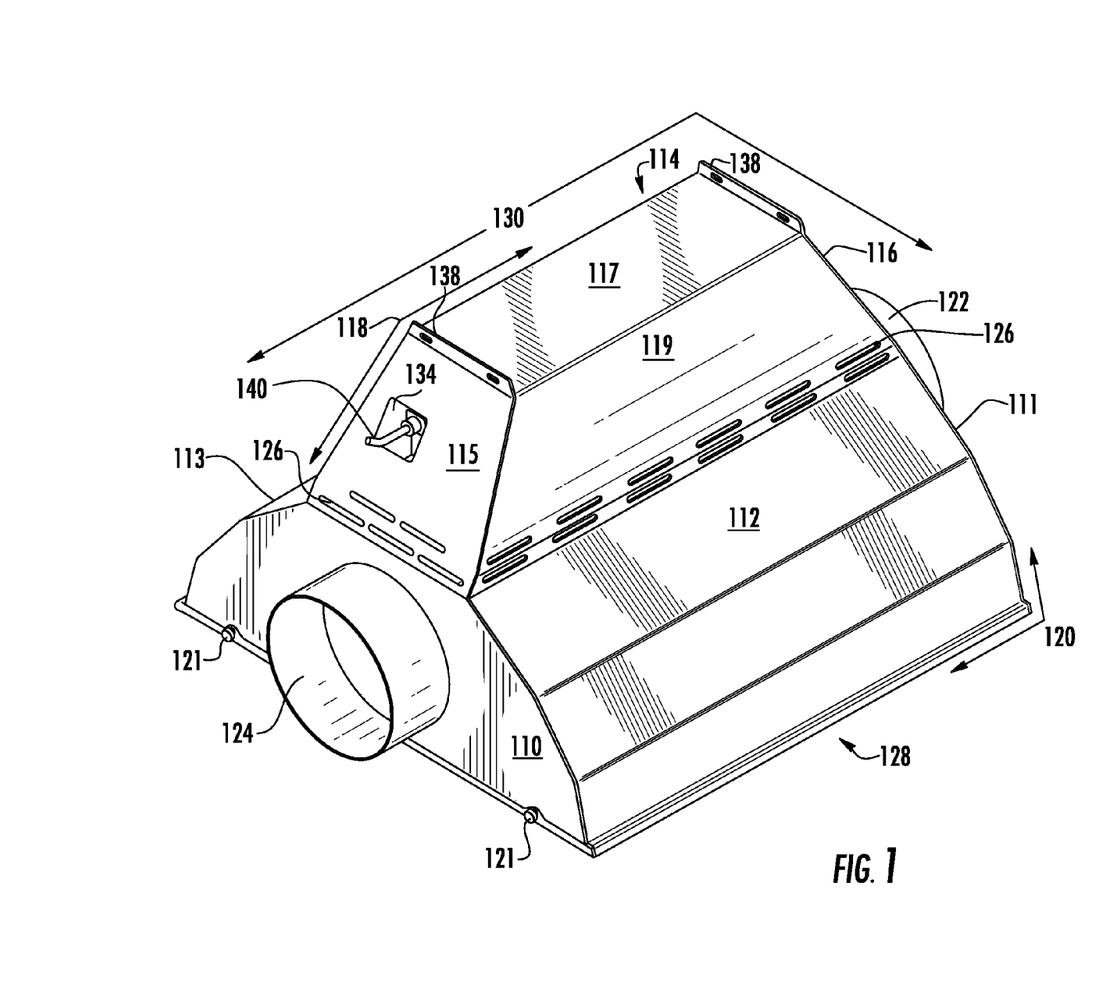
FIG. 1 is a perspective view of one embodiment of the horticulture light fixture having integrated lamp and ballast.

Description FIG. 1:

FIG. 1 illustrates one preferred embodiment of the device and is not representative of all possible embodiments. The exterior structure 130 generally consists of the lower exterior structure 120 and the ballast enclosure 118. The lower exterior structure 120 has a lower flat front side 110; a lower flat rear side 111; a first inclined lower side portion 112; a second inclined lower side portion 113; and a rectangular bottom side 128. Said lower flat front side 110 having a cool atmosphere inlet 124 and said flat rear side 111 having a heated atmosphere exhaust 122. The secure mounting tabs 138 for hanging the device are located generally along the center line of the flat top side 117.

The ballast enclosure 118 consists of a front inclined upper side portion 115; a rear inclined upper side portion 116; a first inclined upper side portion 119; a second inclined upper side portion 114; and a flat top side 117. Louvered vents 126 can be integrated into the front inclined upper side portion 115; the rear inclined upper side portion 116; the first inclined upper side portion 119; and the second inclined upper side portion 114. Cut out of the front inclined upper side portion 115 there is a power inlet hole 134 having a power cord 140 extending out to connect to electrical service.

Figure 7:
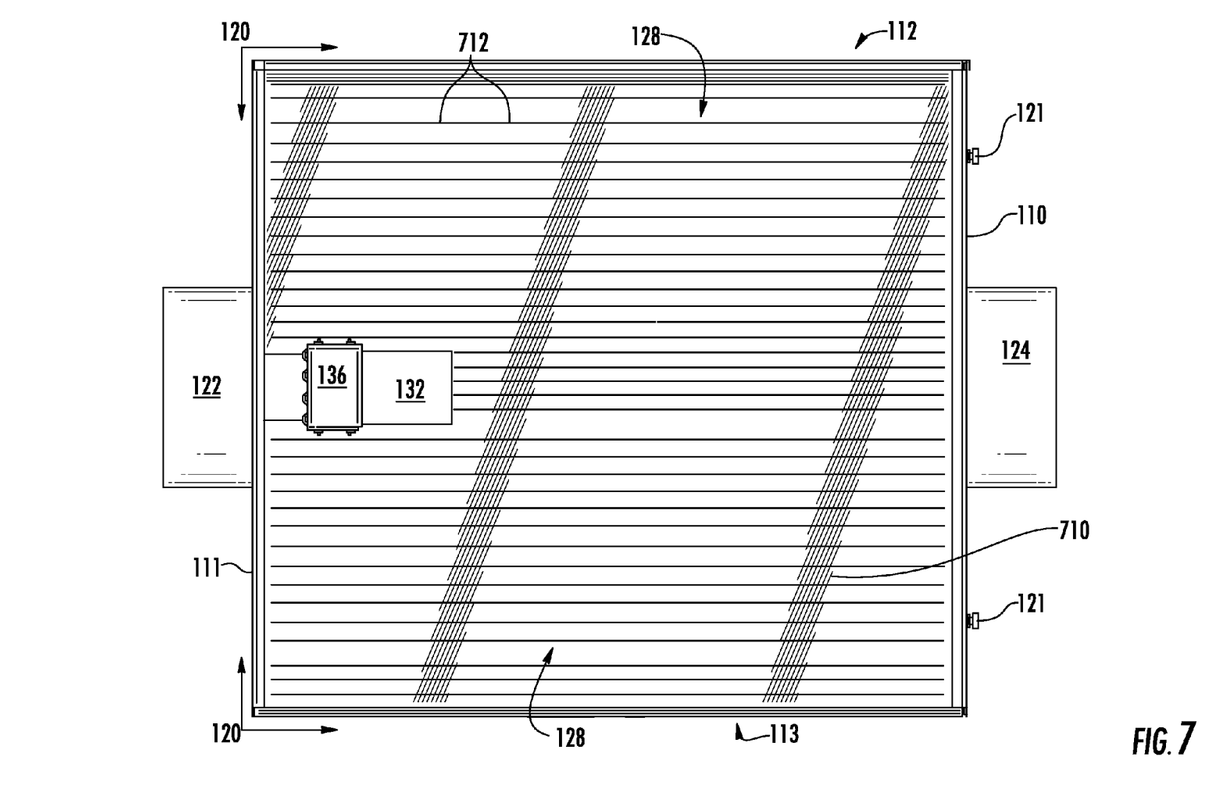
FIG. 7 is a bottom view of the embodiment of the horticulture light fixture having integrated lamp and ballast as shown in FIG. 1.

Fixators 121 fasten into the lower flat front side 110 for the purpose of holding a transparent portion 710 shown in FIG. 7.

Figure 2:
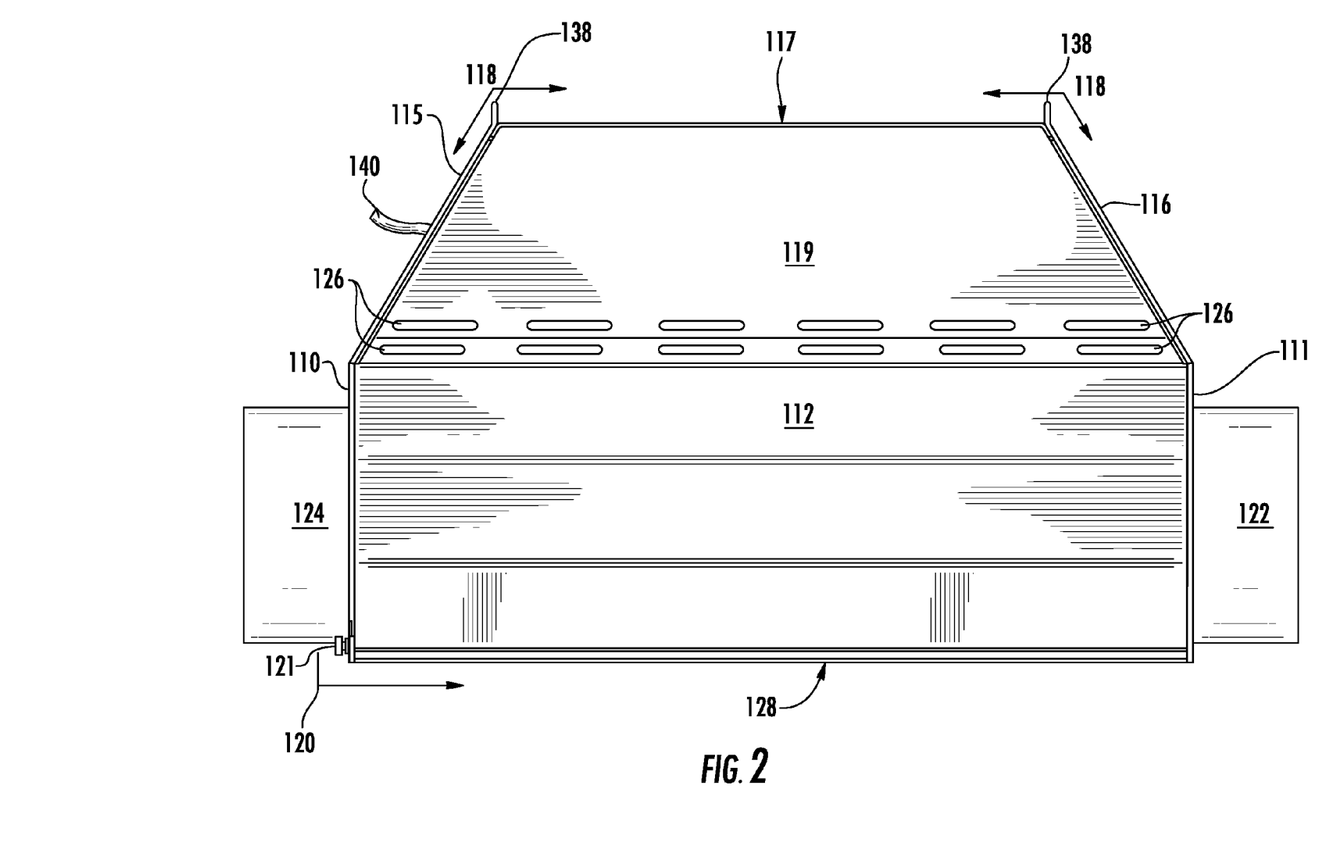
FIG. 2 is a first side view of the embodiment of the horticulture light fixture having integrated lamp and ballast as shown in FIG. 1.

Description FIG. 2:

FIG. 2 illustrates a left side view of one preferred embodiment of the device. The lower exterior structure 120, having a first inclined lower side portion 112 with a lower flat front side 110 and a lower flat rear side 111. Said lower flat front side 110 having a cool atmosphere inlet 124 and said lower flat rear side 111 having a heated atmosphere exhaust 122. The rectangular bottom side 128 is open towards the plants.

Fixators 121 fasten into the lower flat front side 110 for the purpose of holding a transparent portion 710 shown in FIG. 7. The fixators 121 may be placed anywhere along the bottom of the lower exterior structure 120.

The ballast enclosure 118 consists of a first inclined upper side portion 119 having louvered vents 126. A front inclined upper side portion 115 with integrated louvered vents 126; a rear inclined upper side portion 116 with louvered vents 126; and a flat top side 117. The louvered vents 126 are cut in the sheet metal and open downwardly. The louvered vents 126 provide a pathway for either the exhausting of heated air from the ballast enclosure or a pathway for taking in cooling air from the growing environment. The flat top side 117 may also be vented, depending on the application, to facilitate further cooling of the ballast enclosure 118. The louvered vents 126 may also be simple hole punched vents of any shape or size depending upon application, size of the grow lamp, and size of the ballast.

The cool atmosphere inlet 124 provides an opening for cooling air to be forced over the grow lamp and through the lower exterior structure 120 and out the heated atmosphere exhaust 122. This forced cooling air lowers the temperature of the lower exterior structure 120 increasing the longevity of the grow lamp and the lamp ballast.

The flat top side 117 having secure mounting tabs 138 for hanging the device over the plants.

Figure 3:
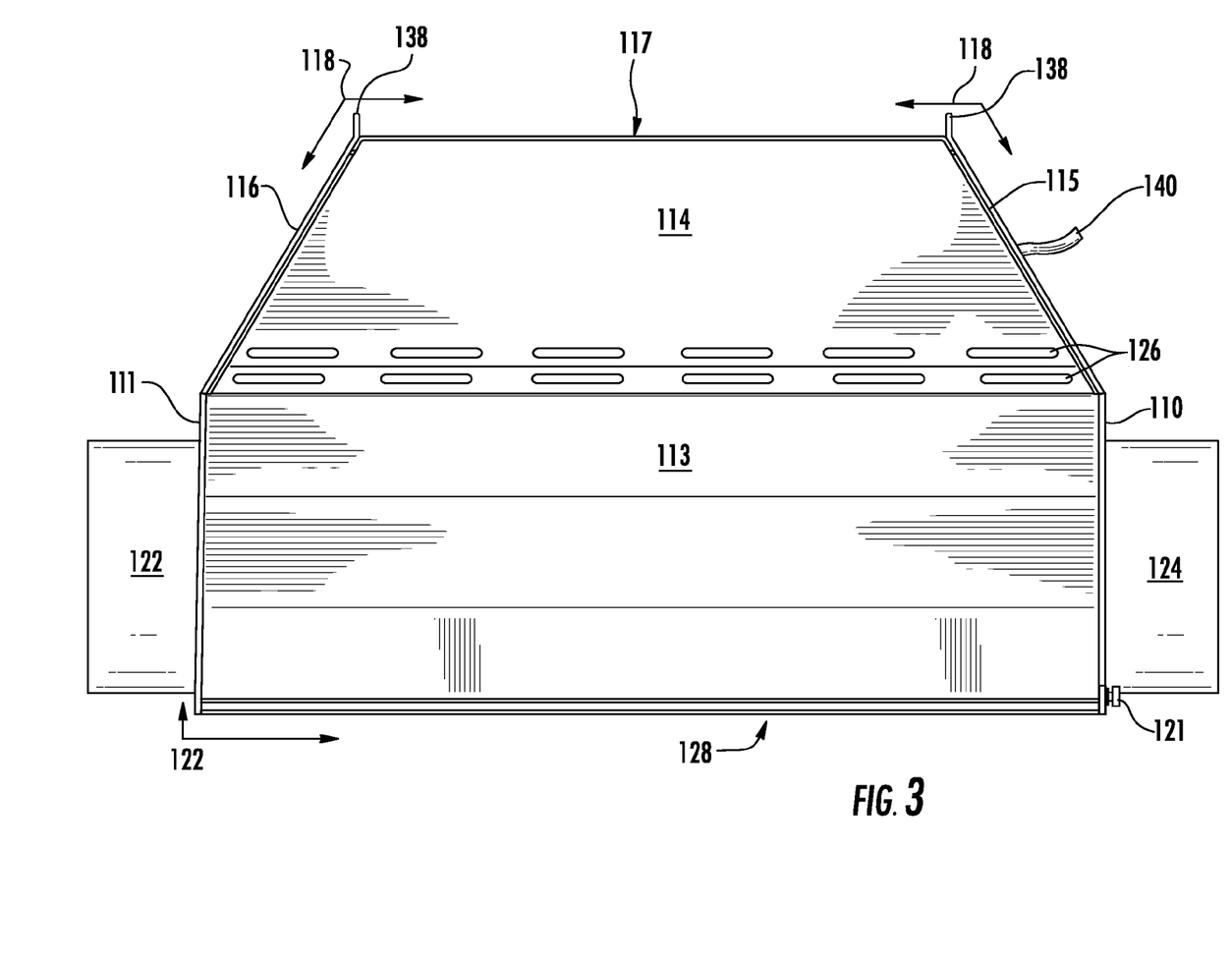
FIG. 3 is a second side view of the embodiment of the horticulture light fixture having integrated lamp and ballast as shown in FIG. 1.

Description FIG. 3:

FIG. 3 illustrates right side view of one preferred embodiment of the device illustrated in FIG. 2. The lower exterior structure 120 has a second inclined lower side portion 113; with a lower flat front side 110 and a lower flat rear side 111. Said lower flat front side 110 having a cool atmosphere inlet 124 and said lower flat rear side 111 having a heated atmosphere exhaust 122. The rectangular bottom side 128 is open to the plants. Fixators 121 fasten into the lower flat front side 110 for the purpose of holding a transparent portion 710 shown in FIG. 7. The fixators 121 may be placed anywhere along the bottom of the lower exterior structure 120.

The ballast enclosure 118 consists of a second inclined upper side portion 114 having louvered vents 126. A front inclined upper side portion 115 with integrated louvered vents 126; a rear inclined upper side portion 116; and a flat top side 117. The louvered vents 126 are cut in the sheet metal and open downwardly. The louvered vents 126 provide a pathway for either the exhausting of heated air from the ballast enclosure 118 or a pathway for taking in cool air from the growing environment.

The flat top side 117 having secure mounting tabs 138 for hanging the device over the plants.

Figure 4:
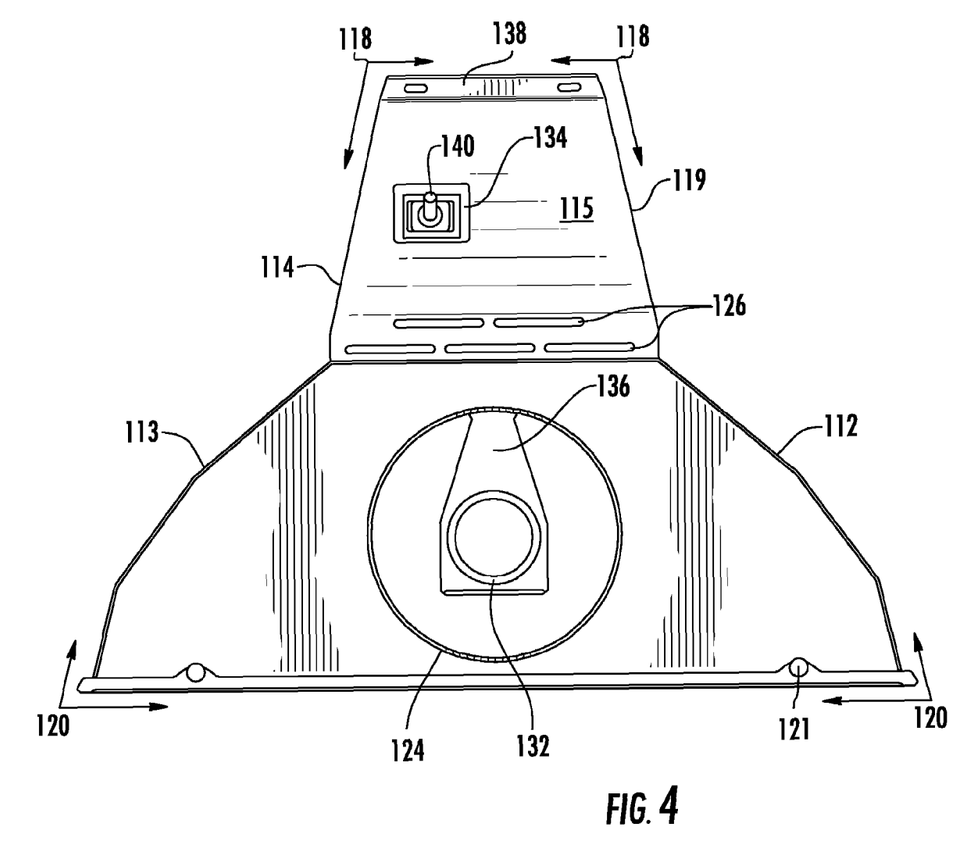
FIG. 4 is a rear side view of the embodiment of the horticulture light fixture having integrated lamp and ballast as shown in FIG. 1.

Description FIG. 4:

FIG. 4 illustrates a front view of one preferred embodiment of the device. The open cool atmosphere inlet 124 provides a through view to the other side where the socket mount 132 attached to the j-box 136 provides the screw in location for the grow lamp. The cool atmosphere inlet 124 is approximately centered in the lower flat front side 110 of the lower exterior structure 120. On either side of the lower flat front side 110 is the first inclined lower side portion 112 and the second inclined lower side portion 113. The rectangular bottom side 128 is open to the plants. The cool atmosphere inlet 124 may be located anywhere on the lower flat front side 110. Fixators 121 fasten into the lower flat front side 110 for the purpose of holding a transparent portion 710 shown in FIG. 7. The fixators 121 may be placed anywhere along the bottom of the lower exterior structure 120.

The ballast enclosure 118 consists of a first inclined upper side portion 119 and a second inclined upper side portion 114, both having louvered vents 126; and front inclined upper side portion 115. The ballast enclosure 118 is capped by the flat top side 117. A power inlet hole 134 is located on the front inclined upper side portion 115, said power inlet hole 134 having a power cord 140 extending out for electrical service. The ballast enclosure 118 sits atop the lower exterior structure 120. The flat top side 117 having a secure mounting tab 138 for hanging the device over the plants.

Figure 5:
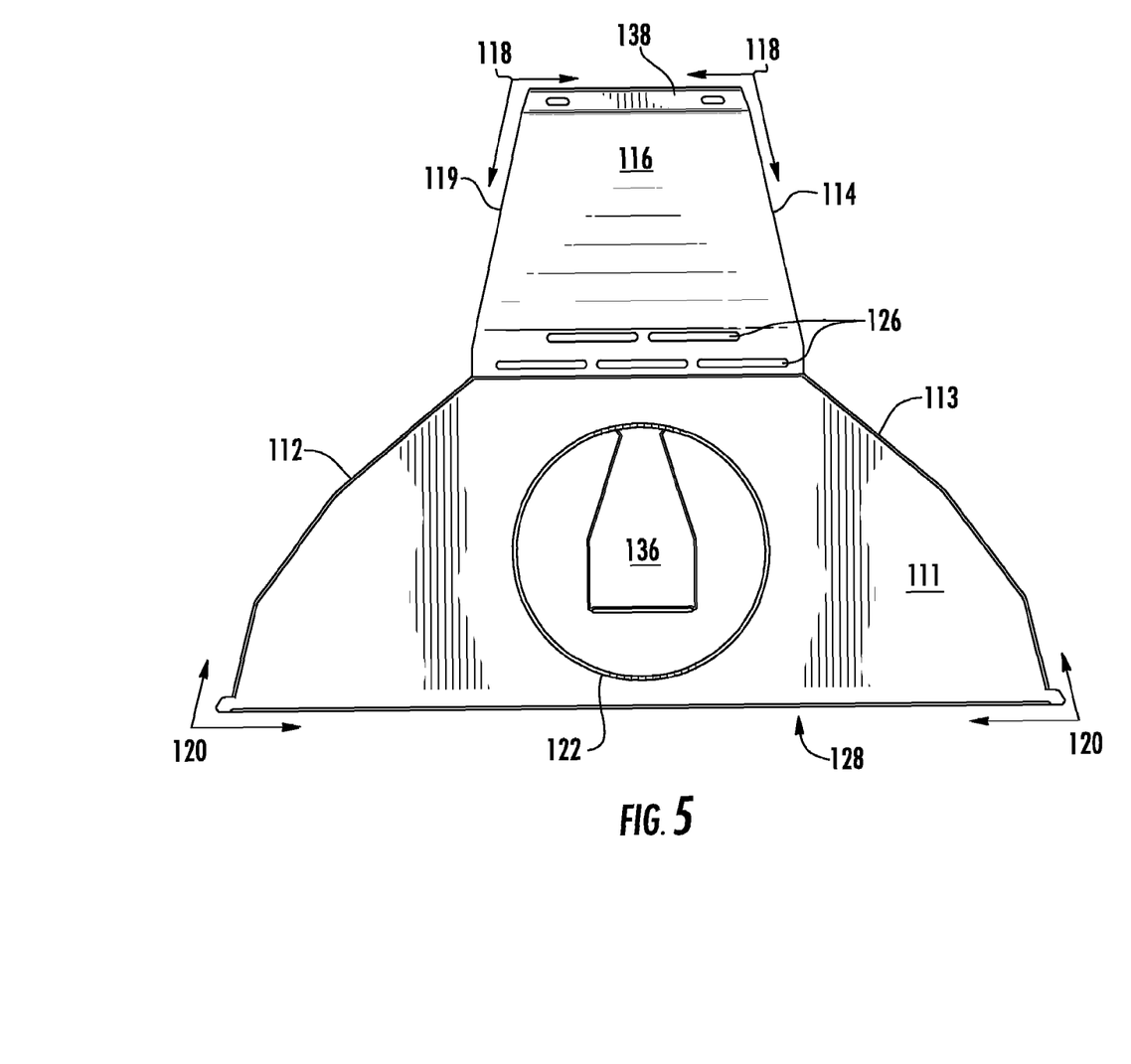
FIG. 5 is a front side view of the embodiment of the horticulture light fixture having integrated lamp and ballast as shown in FIG. 1.

Description FIG. 5:

FIG. 5 illustrates a rear view of one preferred embodiment of the device. The open heated atmosphere exhaust 122 provides a view of the back of the j-box 136 wherein the grow lamp can screw into the other side. The heated atmosphere exhaust 122 is approximately centered in the lower flat rear side 111 of the lower exterior structure 120 but the location can be anywhere on the lower flat rear side 111. On either side of the lower flat rear side 111 is the first inclined lower side portion 112 and the second inclined lower side portion 113. The rectangular bottom side 128 is open downward towards the plants.

The ballast enclosure 118 consists of a rear inclined upper side portion 116, a first inclined upper side portion 119, and a second inclined upper side portion 114, all having louvered vents 126. The ballast enclosure 118 is capped by the flat top side 117. The flat top side 117 having secure mounting tabs 138 for hanging the device over the plants. The louvered vents 126 may be punched out vents or any other vents depending on application, heat generated by the grow lamp, and specific ballast requirements.

Figure 6:
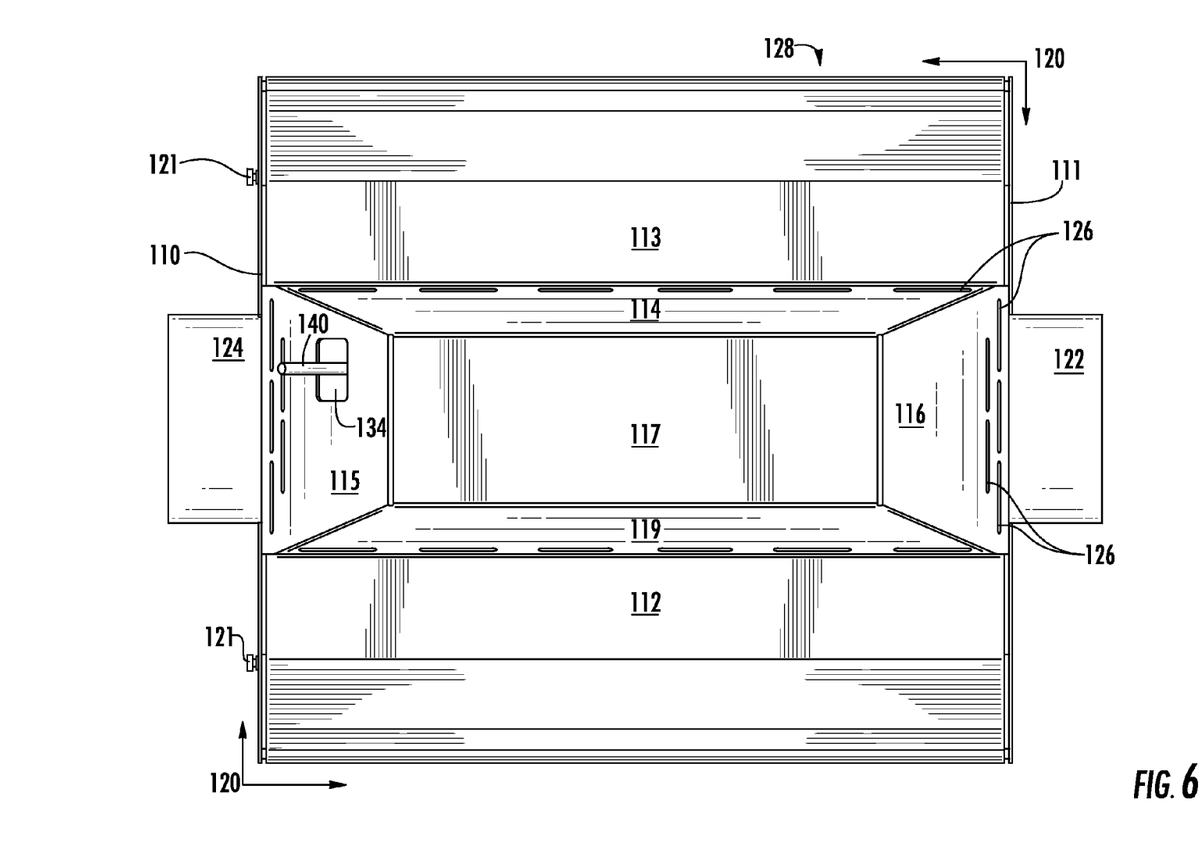
FIG. 6 is a top side view of the embodiment of the horticulture light fixture having integrated lamp and ballast as shown in FIG. 1.

Description FIG. 6:

FIG. 6 illustrates a top view of one preferred embodiment of the device. The lower exterior structure 120 having a first inclined lower side portion 112; a second inclined lower side portion 113; a lower flat front side 110 and a lower flat rear side 111. Said flat front side 110 having a cool atmosphere inlet 124 and said lower flat rear side 111 having a heated atmosphere exhaust 122. The heated atmosphere exhaust 122 and cool atmosphere inlet 124 are interchangeable in that cooling atmosphere can be pushed through in either direction. The rectangular bottom side 128 is open to the plants. Fixators 121 fasten into the lower flat front side 110 for the purpose of holding a transparent portion 710 shown in FIG. 7. The fixators 121 may be placed anywhere along the bottom of the lower exterior structure 120.

The ballast enclosure 118 consists of a front inclined upper side portion 115; a rear inclined upper side portion 116; a first inclined upper side portion 119; a second inclined upper side portion 114; and a flat top side 117. The front inclined upper side portion 115 has a power inlet hole 134 for this embodiment, but the power can be brought in anywhere on the fixture. The power cord 140 extends out of the power inlet hole 134.

The louvered vents 126 provide a pathway for either the exhausting of heated air from the ballast enclosure, or a pathway for taking in cooling air from the growing environment. If it is desirable that the entire device be sealed from the growing environment, no louvered vents 126 are cut.

Description FIG. 7:

FIG. 7 illustrates a bottom side view of one preferred embodiment of the device. The lower exterior structure 120 has a first inclined lower side portion 112; a second inclined lower side portion 113; a lower flat front side 110; and a lower flat rear side 111. Said flat front side 110 having a cool atmosphere inlet 124 and said lower flat rear side 111 having a heated atmosphere exhaust 122.

The rectangular bottom side 128 is sealed by the transparent portion 710. The transparent portion 710 is held in place by fixators 121. Looking through the transparent portion 710 the reflector hood 712 can be seen with a plurality of longitudinal fold lines. The reflector hood 712 may be in any configuration that effectively reflects light towards the plants. The socket mount 132 is placed on the inboard side of the flat rear side 111 being attached by the j-box 136, centered in the heated atmosphere exhaust 122. The reflector hood 712 has matching openings to the cool atmosphere inlet 124 and the heated atmosphere exhaust 122 allowing for forced cooling atmosphere to pass through freely.

Figure 8:
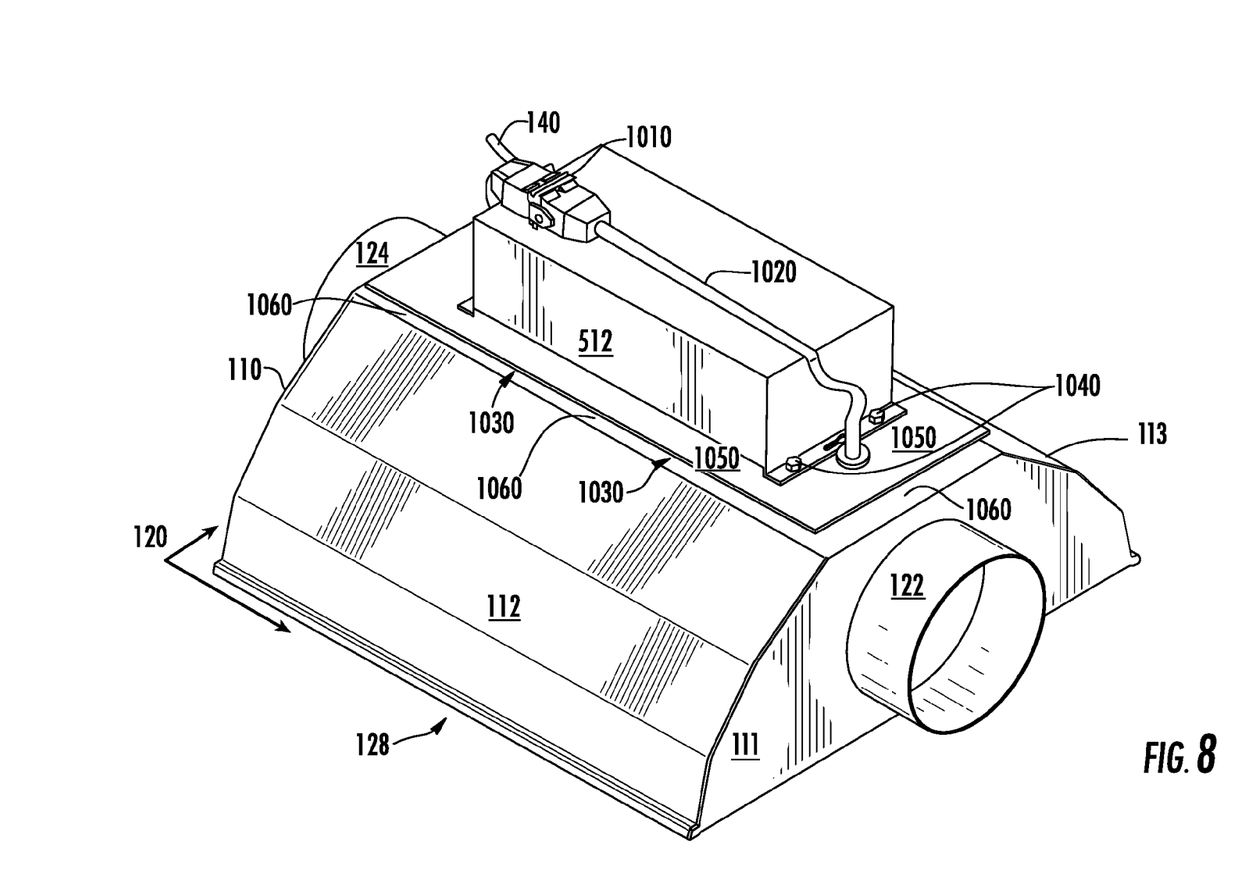
FIG. 8 is a perspective view of the horticulture light fixture with the ballast enclosure removed showing greater detail of the lamp ballast, ballast plate, and the air gap between the ballast plate and the mid top flat side.

Description FIG. 8:

FIG. 8 illustrates a perspective view centering on the exposed lamp ballast 512 having the ballast enclosure 118 removed. The lower exterior structure 120 has a first inclined lower side portion 112; a second inclined lower side portion 113; a lower flat front side 110; and a lower flat rear side 111. Said flat front side 110 having a cool atmosphere inlet 124 and said lower flat rear side 111 having a heated atmosphere exhaust 122.

The mid top flat side 1060 is the mounting surface for the ballast plate 1050. Said ballast plate 1050 provides the mounting surface for the lamp ballast 512. The lamp ballast 512 and ballast plate 1050 are located above the lower exterior structure 120. The ballast plate 1050 is distanced from the mid top flat side 1060 creating an air gap 1030 between the ballast plate 1050 and the mid top flat side 1060. The air gap 1030 width is set by size of the stand offs 1040. The preferred embodiment utilizes stand offs 1040, but any spacing device can be used to keep the ballast plate 1050 and the mid top flat side 1060 separated. The ballast plate 1050 can be of a size and dimension larger than the bottom surface area of lamp ballast 512 and may be of different dimensions, depending upon application. The air gap 1030 provides a thermal barrier between the ballast plate 1050 and mid top flat side 1060. The mid top flat side 1060 is exposed to a higher temperature due to the grow lamp 910 (shown installed in FIG. 9). The heated gas in the air gap 1030 rises up and around the ballast plate 1050, avoiding the lamp ballast 512; and, thus decreasing the gas temperatures directly surrounding the lamp ballast 512. Mounting the lamp ballast 512 directly to the mid top flat side 1060 causes heat to soak into the lamp ballast 512, causing premature failure even with cooling atmosphere moving between the cool atmosphere inlet 124 and the heated atmosphere exhaust 122. The preferred embodiment demonstrates the ballast plate 1050 and the air gap 1030 working in concert when, in some applications, only the ballast plate 1050 or the air gap 1030 are alone required, depending on the size of the grow lamp 910 and heat sensitivity of the lamp ballast 512.

The lamp ballast 512 connects to electrical service via the power cord 140, converting to the requisite power for the selected grow lamp 910 (shown in FIG. 9), and connecting to the grow lamp via the lamp cord 1020. The lamp cord 1020 connects to the lamp ballast 512 at the ballast power connector 1010.

Figure 9:
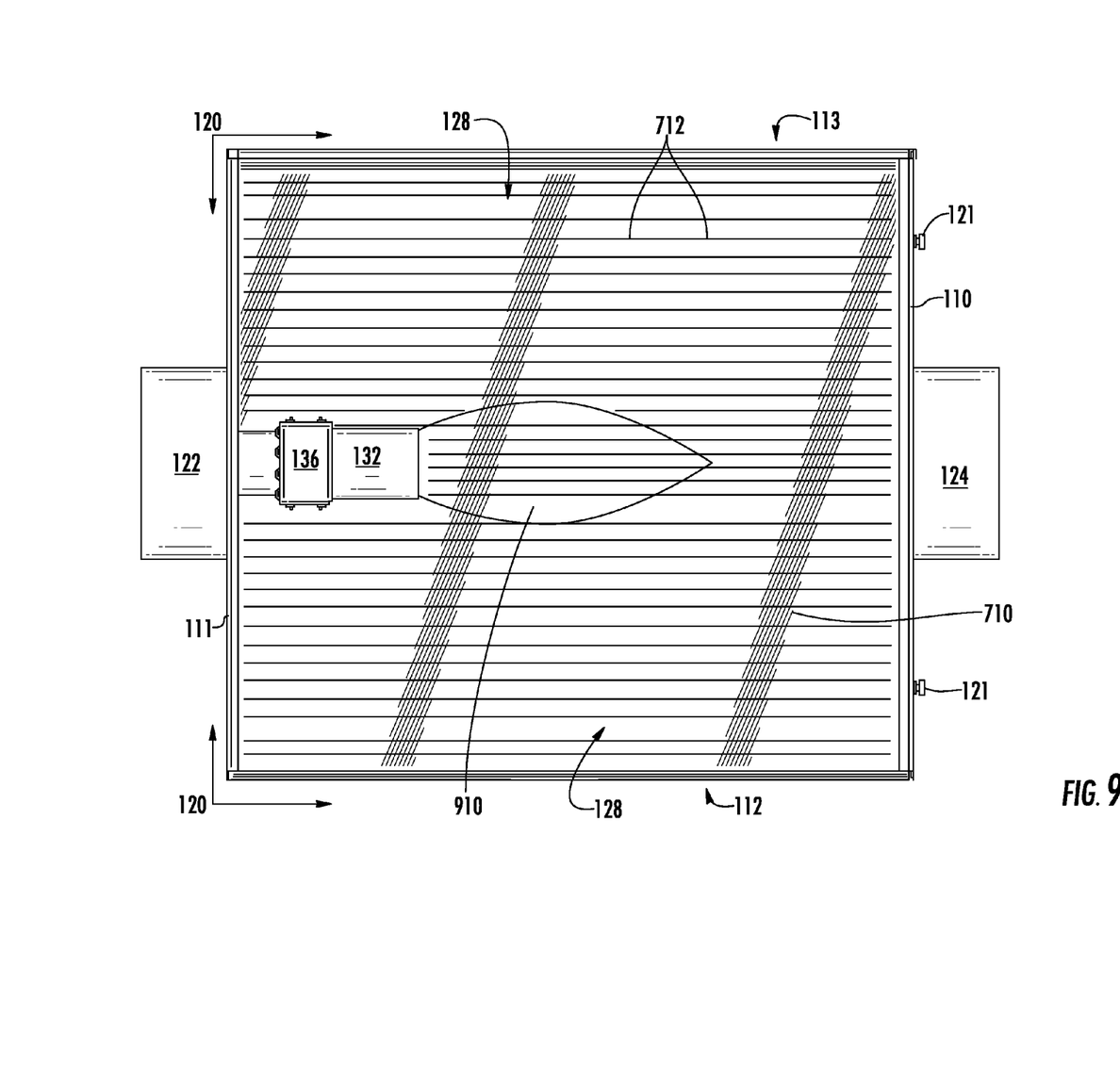
FIG. 9 is a bottom view of the embodiment with a grow lamp installed in proper position for use.

Description FIG. 9:

FIG. 9 illustrates a bottom side view of one preferred embodiment of the device having a grow lamp 910 installed. The lower exterior structure 120 has a first inclined lower side portion 112; a second inclined lower side portion 113; a lower flat front side 110; and a lower flat rear side 111. Said flat front side 110 having a cool atmosphere inlet 124 and said lower flat rear side 111 having a heated atmosphere exhaust 122. The rectangular bottom side 128 is open towards the plants and the grow lamp 910 and the reflector hood 712 can be seen through the transparent portion 710, said transparent portion 710 sealing off the growing environment from the heated atmosphere moving through the fixture. The socket mount 132 is placed on the inboard side of the flat rear side 111, centered in the heated atmosphere exhaust 122. The reflector hood 712 has matching openings to the cool atmosphere inlet 124 and the heated atmosphere exhaust 122.

Figure 10:
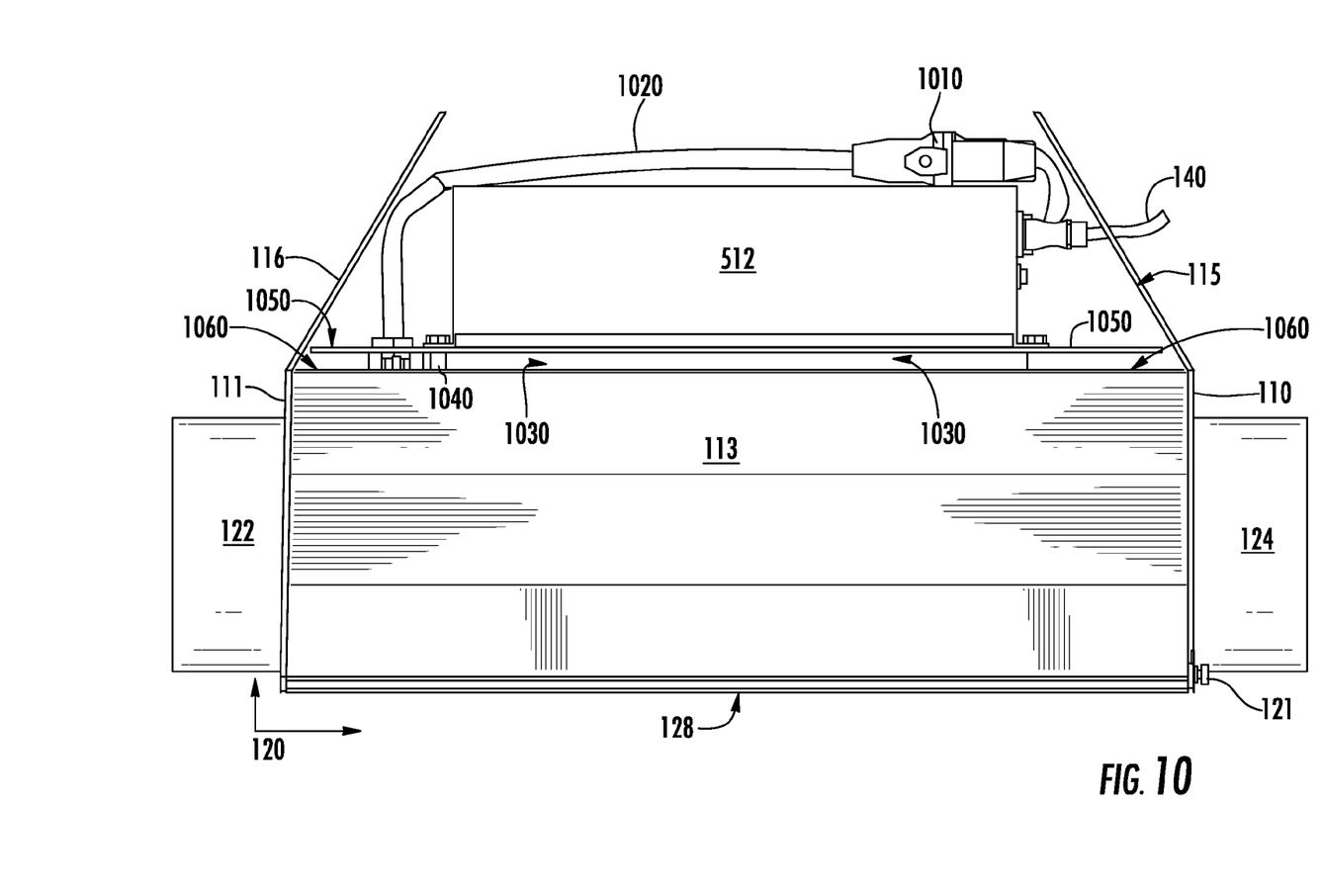
FIG. 10 is a side view of the embodiment having part of the ballast enclosure removed and showing the lamp ballast mounted to the ballast plate, stand-offs between the ballast plate and the mid top flat side, further demonstrating the air gap between the mid top flat side and the ballast plate of the horticulture light fixture having integrated lamp and ballast.

Description FIG. 10:

FIG. 10 illustrates a side view of one preferred embodiment of the device having the first inclined upper side portion 119, second inclined upper side portion 114, and the flat top side 117 removed to further demonstrate the relative configuration between the lamp ballast 512, ballast plate 1050, air gap 1030, and the mid top flat side 1060.

The lower exterior structure 120, having a first inclined lower side portion 112 with a lower flat front side 110 and a lower flat rear side 111. Said lower flat front side 110 having a cool atmosphere inlet 124 and said lower flat rear side 111 having a heated atmosphere exhaust 122. The rectangular bottom side 128 is open towards the plants.

Fixators 121 fasten into the lower flat front side 110 for the purpose of holding a transparent portion 710 shown in FIG. 7. The fixators 121 may be placed anywhere along the bottom of the lower exterior structure 120.

The ballast enclosure 118 consists of a first inclined upper side portion 119 and second inclined upper side portion 114 that have both been removed for this FIG. 10; a front inclined upper side portion 115; a rear inclined upper side portion 116; and, a flat top side 117 that has also been removed for this FIG. 10. The cool atmosphere inlet 124 provides an opening for cooling air to be forced through the lower exterior structure 120, over the grow lamp, and out the heated atmosphere exhaust 122. This forced cooling air lowers the temperature of the exterior structure 120 and increases the longevity of the grow lamp 910 and the lamp ballast 512.

The grow lamp 910 creates significant heat that is transferred to the mid top flat side 1060 creating a high surface temperature that would cause the lamp ballast 512 to prematurely fail if mounted directly to the mid top flat side 1060. The high surface temperature of the mid top flat side 1060 heats the gas in the air gap 1030 between the mid top flat side 1060 and the ballast plate 1050. The heated atmosphere rises up from the mid top flat side 1060 and is deflected by the ballast plate 1050 around and away from the lamp ballast 512. The dimensions of the ballast plate 1050 can vary depending on the surface temperature of the mid top flat side 1060 and the desired operating environment of the selected lamp ballast 512. When a larger grow lamp 910 is installed, a larger ballast plate 1050 may be required to adequately shield the lamp ballast 512 from the heated gas rising off the mid top flat side 1060. The distance between the ballast plate 1050 and the mid top flat side 1060 may be increased to create a larger air gap 1030, further thermally isolating the lamp ballast 512 from the heat generated from the grow lamp 910. The size of the air gap 1030 can be set by using stand off 1040 spacers.

The ballast enclosure 118 may be used to cover the lamp ballast 512, but is not necessary to the integration of the lamp ballast 512 and the grow lamp 910 into a single horticulture fixture.

| REFERENCE NUMBERS: | |
| --- | --- |
| 110  lower flat front side | 124  cool atmosphere inlet |
| 111  lower flat rear side | 126  louvered vents |
| 112  first inclined lower side portion | 128  rectangular bottom side |
| 113  second inclined lower side portion | 130  exterior structure |
| 114  second inclined upper side portion | 132  socket mount |
| 115  front inclined upper side portion | 134  power inlet hole |
| 116  rear inclined upper side portion | 136  j-box |
| 117  flat top side | 138  secure mounting tabs |
| 118  ballast enclosure | 140  power cord |
| 119  first inclined upper side portion | 512  lamp ballast |
| 120  lower exterior structure | 710  transparent portion |
| 121  fixators | 712  reflector hood |
| 122  heated atmosphere exhaust | 910  grow lamp |
| 1010  ballast power connector | 1020  lamp cord |
| 1030  air gap | 1040  stand off |
| 1050  ballast plate | 1060  mid top flat side |

What is claimed:

1. The method for integrating a lamp ballast within a grow light fixture comprising the steps of:
    a) enclosing the grow lamp in a lower exterior structure;
    b) securing the lamp ballast to a ballast plate;
    c) mounting said ballast plate to the top side of the lower exterior structure using at least one stand off spacer between the ballast plate and the lower exterior structure; and,
    d) said stand off spacer being the size of the desired air gap between the ballast plate and the lower exterior structure.

2. A horticultural light system having an integrated lamp and ballast comprising:

an exterior structure having a lower exterior structure and a ballast enclosure;

said lower exterior structure having a lower flat front side, a lower flat rear side, a mid top flat side, and a rectangular bottom side being open towards the plants, including a cool atmosphere inlet on the flat front side, and a heated atmosphere exhaust outlet on the rear flat side;

said ballast enclosure having a front inclined upper portion, a rear inclined upper portion, a first inclined upper side portion, a second inclined upper side portion, and a flat top side, the bottom bounded by the mid top flat side of the lower exterior structure;

at least one vent cut through the ballast enclosure;

a light reflector hood within said lower exterior structure, constructed and arranged to reflect light towards plants, further having a first opening at the cool atmosphere inlet, and a second opening at the heated atmosphere exhaust outlet;

a transparent portion between the light reflector hood and the plants, fittingly attached to said lower exterior structure sealing the atmosphere within the light reflector chamber from the growing environment of the plants;

a lamp ballast integrated above said lower exterior structure and within said ballast enclosure, mounted to a ballast plate, said ballast plate fixedly attached to the mid top flat side of the lower exterior structure, leaving an air gap between said ballast plate and the mid top flat side;

at least one support socket bracket for mounting a lamp within the lower exterior structure.

3. The horticultural light apparatus of claim 2, wherein the ballast plate is separated from the mid top flat side by a plurality of stand off spacers, said stand off spacers setting the air gap size between the ballast plate and mid top flat side.

* * * * *